United States Patent
Lee et al.

(10) Patent No.: US 9,101,240 B2
(45) Date of Patent: Aug. 11, 2015

(54) GARLIC PRESS

(71) Applicants: Tung-Hsien Lee, Tainan (TW);
Chiung-Hung Shen, Tainan (TW)

(72) Inventors: Tung-Hsien Lee, Tainan (TW);
Chiung-Hung Shen, Tainan (TW)

(73) Assignee: Tung-Hsien Shen, Tainan (TW)

( * ) Notice: Subject to any disclaimer, the term of this patent is extended or adjusted under 35 U.S.C. 154(b) by 38 days.

(21) Appl. No.: 13/928,459

(22) Filed: Jun. 27, 2013

(65) Prior Publication Data

US 2014/0020573 A1 Jan. 23, 2014

(30) Foreign Application Priority Data

Jul. 19, 2012 (TW) .............................. 101213899 U (51) Int. Cl.
*B30B 9/06* (2006.01)
*A47J 19/06* (2006.01)
*A47J 19/04* (2006.01)

(52) U.S. Cl.
CPC . *A47J 19/06* (2013.01); *A47J 19/04* (2013.01)

(58) Field of Classification Search
CPC .................................. A47J 19/04; A47J 19/06
USPC ................. 100/110, 112, 125, 213, 234, 243; 99/495, 508
See application file for complete search history.

(56) References Cited

U.S. PATENT DOCUMENTS

|    61,251 | A  | * | 1/1867  | Reece et al. .................. 100/213 |
| 1,427,898 | A  | * | 9/1922  | Himelfarb ....................... 30/278 |
| 2,776,616 | A  | * | 1/1957  | Sarossy .......................... 100/234 |
| 5,463,941 | A  | * | 11/1995 | Gibson ............................. 99/495 |
| 6,092,460 | A  | * | 7/2000  | Engelhardt ...................... 99/495 |
| 6,382,090 | B1 | * | 5/2002  | Kokkinos et al. ............... 99/510 |
| 6,505,548 | B1 | * | 1/2003  | Lillelund et al. ............... 99/510 |
| 7,302,887 | B1 | * | 12/2007 | Chapman et al. ............. 100/234 |
| 7,654,197 | B2 | * | 2/2010  | Knusel .......................... 100/110 |
| 2004/0134362 | A1 | * | 7/2004 | Harrison-Griffin et al. .. 100/234 |
| 2010/0139508 | A1 | * | 6/2010 | Hansel et al. ................. 100/234 |

FOREIGN PATENT DOCUMENTS

FR           1035542 A  *  8/1953  ............. A47J 19/06

* cited by examiner

*Primary Examiner* — Shelley Self
*Assistant Examiner* — Leonel Vasquez
(74) *Attorney, Agent, or Firm* — Alan D. Kamrath; Kamrath IP Lawfirm, P.A.

(57) ABSTRACT

A garlic press includes a grip member and a crush member pivotally connected with the grip member. The grip member includes a housing body and an upper handle extended backward from the housing body. The housing body is adapted for accommodating garlic. The crush member includes a crush body which can be movably inserted into the housing body for crushing the garlic into mash. The garlic press may further include a cleaning device which is coupled on a bottom portion of the housing body for cleaning out the garlic mash remaining on the housing body. Further, the pivotal point of the garlic press is disposed close to a middle portion of the garlic press structure to make the garlic press to be convenient for using.

7 Claims, 12 Drawing Sheets

150
GARLIC PRESS

BACKGROUND OF THE INVENTION

The present invention relates to a garlic press and, more particularly, to a garlic press allowing remaining garlic mash to be cleaned out conveniently.

Figure 11:
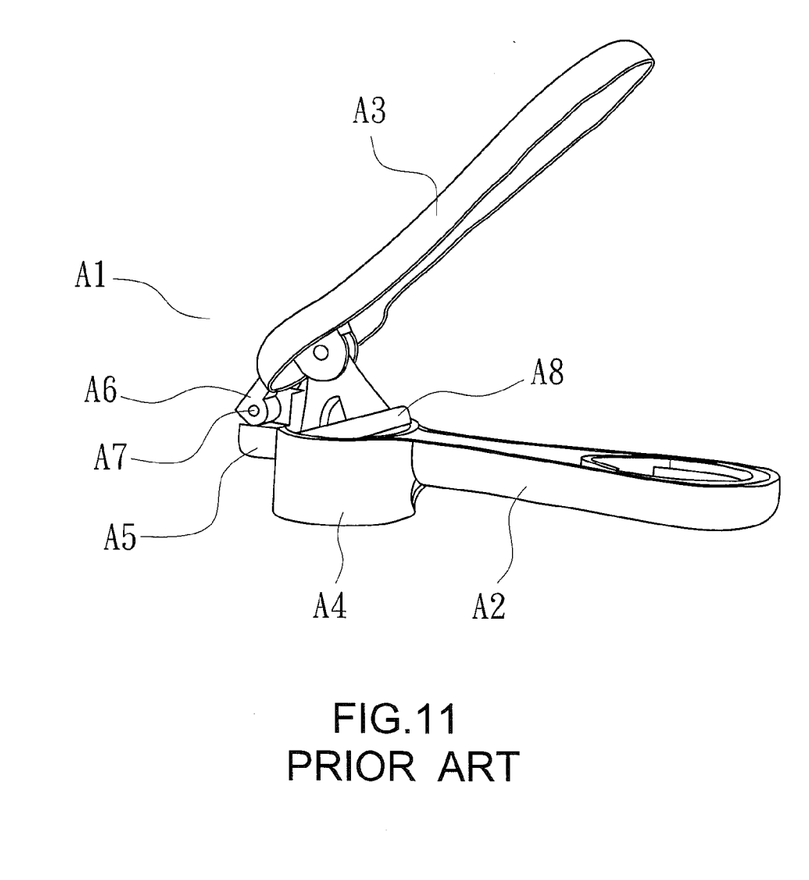
FIG. 11 is a schematic view of a conventional garlic press.

A garlic press is widely used for crushing garlic. FIG. 11 shows a conventional garlic press A1 which includes a lower supporting member A2 and an upper press member A3. The lower supporting member A2 includes a housing body A4. A connecting portion A5 of the lower supporting member A2 is pivotally connected with a coupling portion A6 of the upper press member A3 by a pin A7, and the pivotal point defined by the pin A7 is at a front end of the lower supporting member A2. When using the garlic press A1, the upper press member A3 is used as an active member for pressing a crush member A8 coupled with the upper press member A3 downward into the housing body A4 for crushing garlic in the housing body A4.

Even though the pivotal point of the garlic press A1 disposed at the front end of the lower supporting member A2 is a mechanical advantage of extending the force arm, a larger angle of opening between the upper press member A3 and the lower supporting member A2 is required for pouring out the mashed garlic and subsequent cleaning. Therefore, the convenience of using the garlic press A1 is substantially limited. More specifically, an angle for operating the garlic press A1 during usage and the angle of opening are comparatively larger, which will affect the convenience of usage negatively. Furthermore, a cleaning tool for the conventional garlic press is inserted externally as a separate device, which lacks the functionality of integrated design and makes the overall garlic press to be oversize.

BRIEF SUMMARY OF THE INVENTION

It is an objective of the present invention to provide a garlic press for improving the above mentioned problems. The pivotal point of the garlic press is disposed close to a middle portion of the garlic press structure to make the garlic press to be convenient for using. Furthermore, the garlic press is integrated with a cleaning device for cleaning remaining garlic mash on the garlic press after usage.

To achieve this and other objectives, a garlic press of the present invention includes a grip member and a crush member. The grip member includes a housing body and an upper handle extending backward from an upper end of the housing body. An opening is formed in the upper end of the housing body, and a chamber is formed in the housing body for accommodating garlic. The upper handle includes two lateral walls formed on a front end thereof and defining a pivotal space between the two lateral walls. Two opposed rear pivotal holes are disposed in the two lateral walls of the upper handle. The crush member includes a crush body and a lower handle extending backward from a rear end of the crush body. A rear section of the lower handle is disposed below the upper handle, and a front end of the lower handle is disposed inside the pivotal space of the upper handle and pivotally connected between the two lateral walls of the upper handle. The crush body is movably received in the chamber of the housing body for crushing the garlic. An axial hole is formed in the front end of the lower handle, and a pin extends through the rear pivotal holes of the upper handle and the axial hole of the lower handle to allow the crush member to be turned pivotally relative to the grip member.

The pivotal point of the grip member and the crush member is disposed near a middle portion of the garlic press, so that the crushing function of the garlic press can be performed more smoothly, and the operating and opening angles can be reduced to enhance the convenience of crushing.

Preferably, the crush body is formed as a hollow ring.

In a preferred form, the garlic press further includes a cleaning device used for cleaning out garlic mash remaining on the housing body.

The present invention will become clearer in light of the following detailed description of illustrative embodiments of this invention described in connection with the drawings.

DETAILED DESCRIPTION OF THE INVENTION

Figure 1:
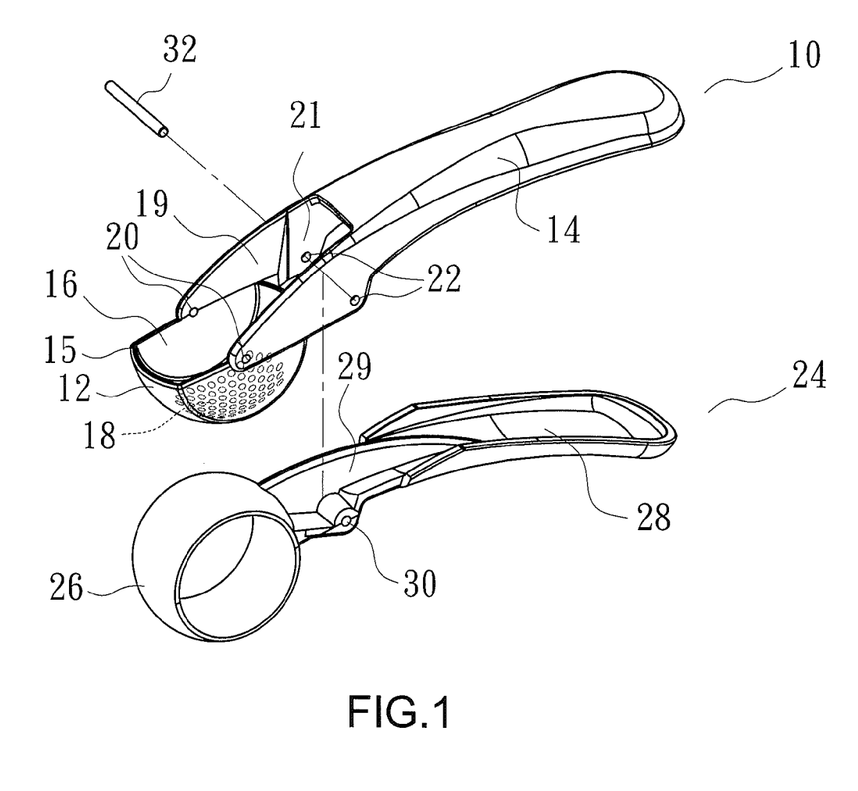
FIG. 1 shows an exploded, perspective view of a garlic press according to a first embodiment of the present invention.
Figure 2:
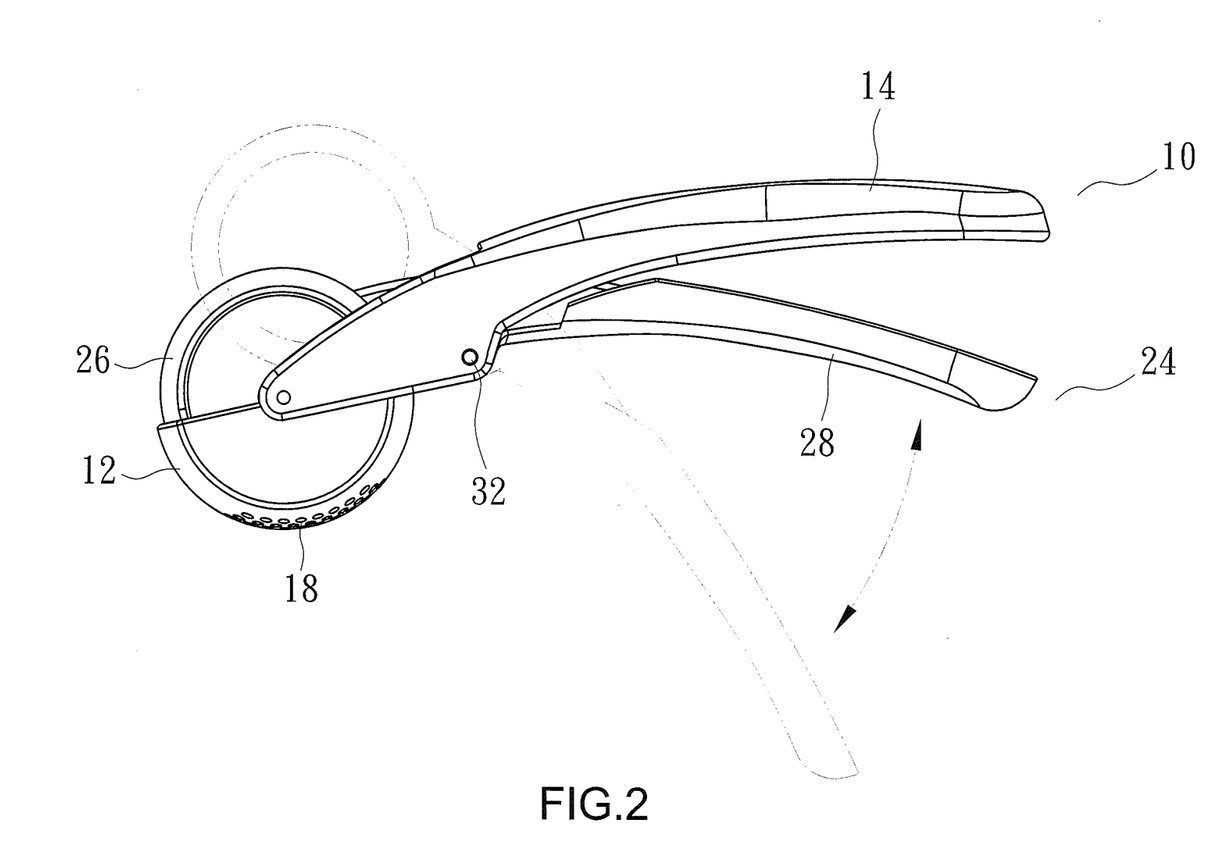
FIG. 2 is a schematic view of the garlic press of FIG. 1 being operated.
Figure 3:
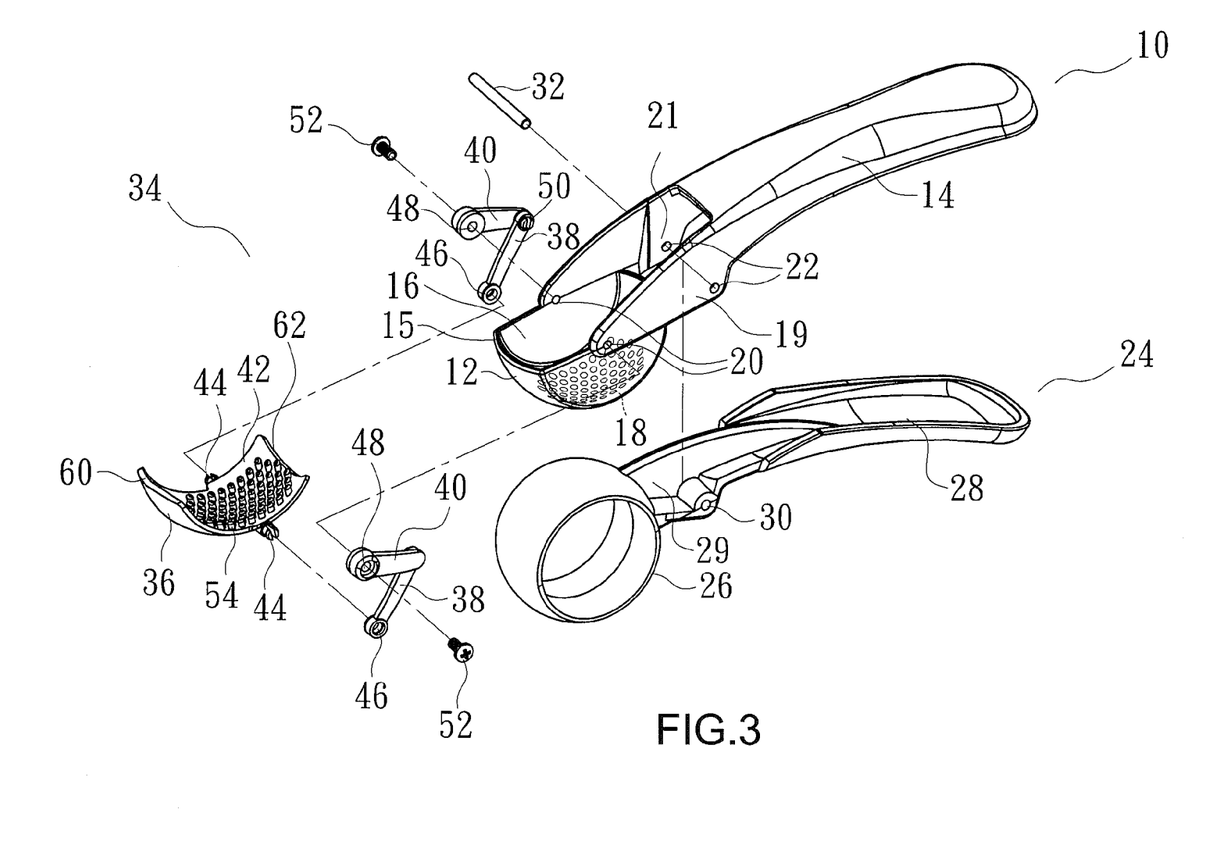
FIG. 3 is an exploded, perspective view of a garlic press according to a second embodiment of the present invention.

A garlic press according to a first embodiment of the present invention is shown in FIGS. 1 and 2 of the drawings and includes a grip member 10 and a crush member 24. The grip member 10 includes a housing body 12 and an upper handle 14 extending backward from an upper end of the housing body 12. An opening 15 is formed in the upper end of the housing body 12, and a chamber 16 is disposed inside the housing body 12 for accommodating to-be-crushed garlic clove or garlic bulblet (not shown). A plurality of holes 18 is disposed in a bottom of the housing body 12 to prevent the chamber 16 from becoming a complete closed space during crushing of garlic. The holes 18 can reduce the resistance during crushing, and a portion of garlic juice produced from crushing garlic can be discharged through the holes 18 to reduce the acting force required from crushing. Two spaced lateral walls 19 are formed on a front end of the upper handle 14 and define a pivotal space 21 between the two spaced lateral walls 19. Two opposed front pivotal holes 20 and two opposed rear pivotal holes 22 are disposed in the two lateral walls 19 respectively.

The crush member 24 includes a crush body 26 and a lower handle 28 extending backward from a rear end of the crush body 26. The crush body 26 is formed as a hollow ring designed for reducing its weight while still maintaining the structural strength. A rear section of the lower handle 28 is disposed below the upper handle 14. A front end 29 of the lower handle 28 is disposed inside the pivotal space 21 of the grip member 10. An axial hole 30 is formed in the front end 29 of the lower handle 28. A pin 32 penetrates through the rear pivotal holes 22 of the grip member 10 and the axial hole 30 to allow the crush member 24 to turn pivotally relative to the grip member 10 by using the pin 32 as a pivotal point, and to allow the crush body 26 to be movably inserted into the chamber 16 of the housing body 12. When the upper handle 14 is gripped on and the lower handle 28 is turned towards the upper handle 14, the crush body 26 will be inserted into the chamber 16 for crushing the garlic in the housing body 12. The crushed garlic will become mashed garlic and is accommodated inside the housing body 12. On the other hand, when the lower handle 28 is moved further away from the upper handle 14 as shown by imaginary lines in FIG. 2, the crush body 26 is withdrawn from the chamber 16 of the housing body 12.

FIGS. 3 through 9 show a garlic press according to a second embodiment of the present invention and including a grip member 10, a crush member 24, and a cleaning device 34. The grip member 10 and the crush member 24 have the same afore-mentioned structures. The crush body 26 can be movably inserted into the housing body 12 for crushing the garlic accommodated inside the chamber 16.

Figure 4:
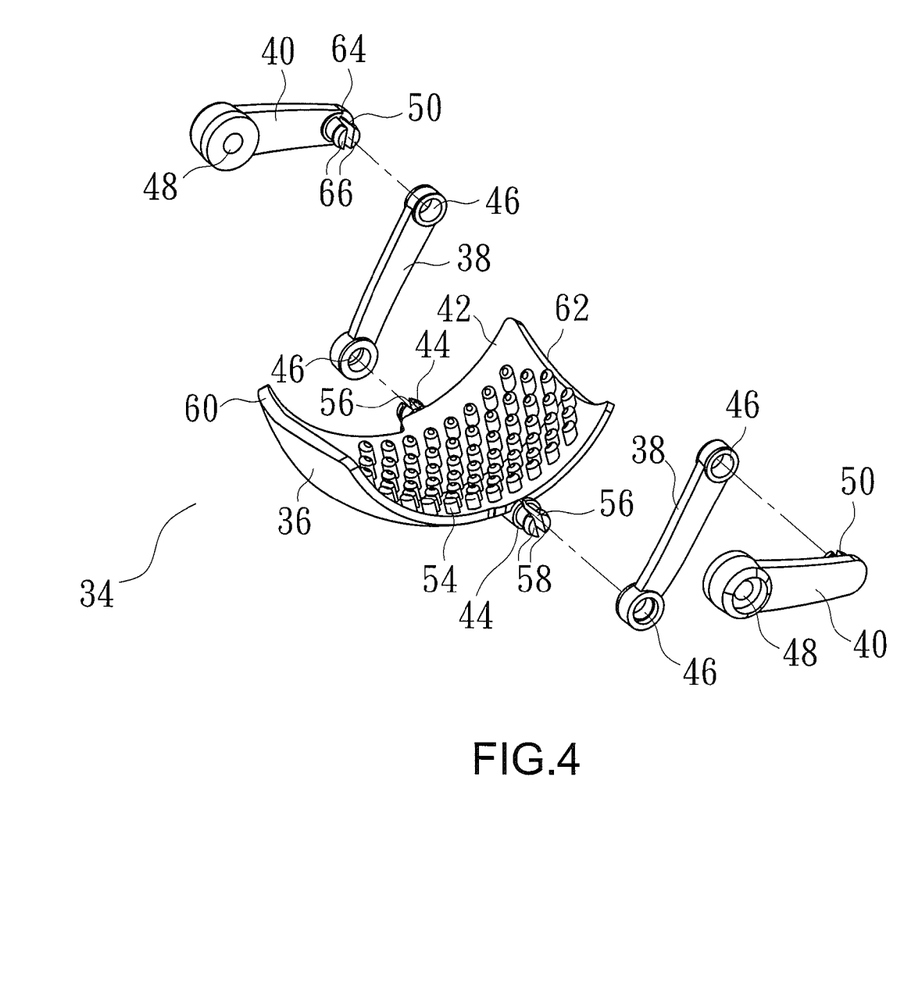
FIG. 4 is an exploded, perspective view of a cleaning device of the garlic press of FIG. 3.
Figure 5:
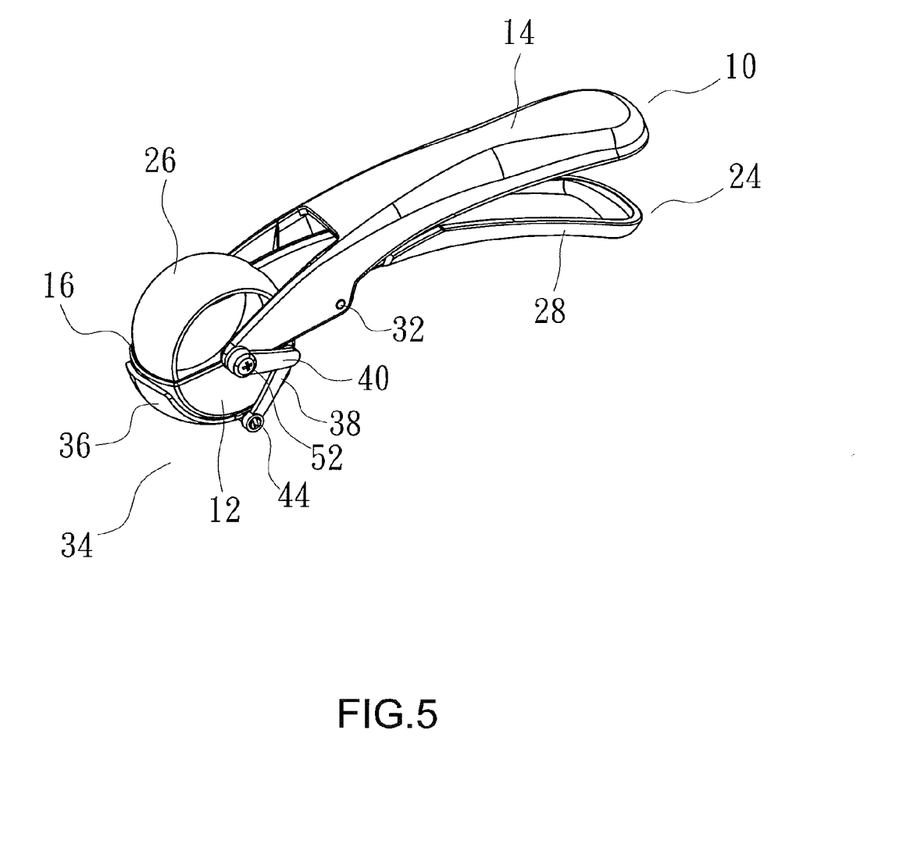
FIG. 5 is a perspective view of the garlic press of FIG. 3.

The cleaning device 34 includes a scraper 36, two first links 38, and two second links 40. The scraper 36 includes a concave inner surface 42, a front edge 60 and a rear edge 62. A pivotal pillar 44 is extended outwardly from each of two sides of the scraper 36. A coupling hole 46 is disposed in each end of each first link 38. A connecting hole 48 is disposed in one end of each second link 40, and a pivotal pillar 50 is disposed at another end of each second link 40. The coupling holes 46 of each first link 38 are pivotally connected with a corresponding pivotal pillar 44 of the scraper 36 and the pivotal pillar 50 of a corresponding second link 40 respectively. A fastener 52 extends through the connecting hole 48 of each second link 40 and locks into a corresponding front pivotal hole 20 of the upper handle 14 to pivotally connect the cleaning device 34 to the upper handle 14. A plurality of protruded pillars 54 is disposed on the concave inner surface 42 of the scraper 36. In this embodiment, each pivotal pillar 44 of the scraper 36 includes a slot 56 and two spaced projections 58 formed on an outer end of the pivotal pillar 44. When the coupling hole 46 of the first link 38 is mounted around the corresponding pivotal pillar 44, the projections 58 will contract inwardly and, then, will expand outwardly after the projections 58 have penetrated through the coupling hole 46, in order to produce the effect of axial positioning. The pivotal pillar 50 of the second link 40 includes a slot 64 and two projections 66 disposed on an outer end of the pivotal pillar 50, allowing the pivotal pillar 50 to be connected with an associated coupling hole 46 of the first link 38 conveniently.

Figure 6:
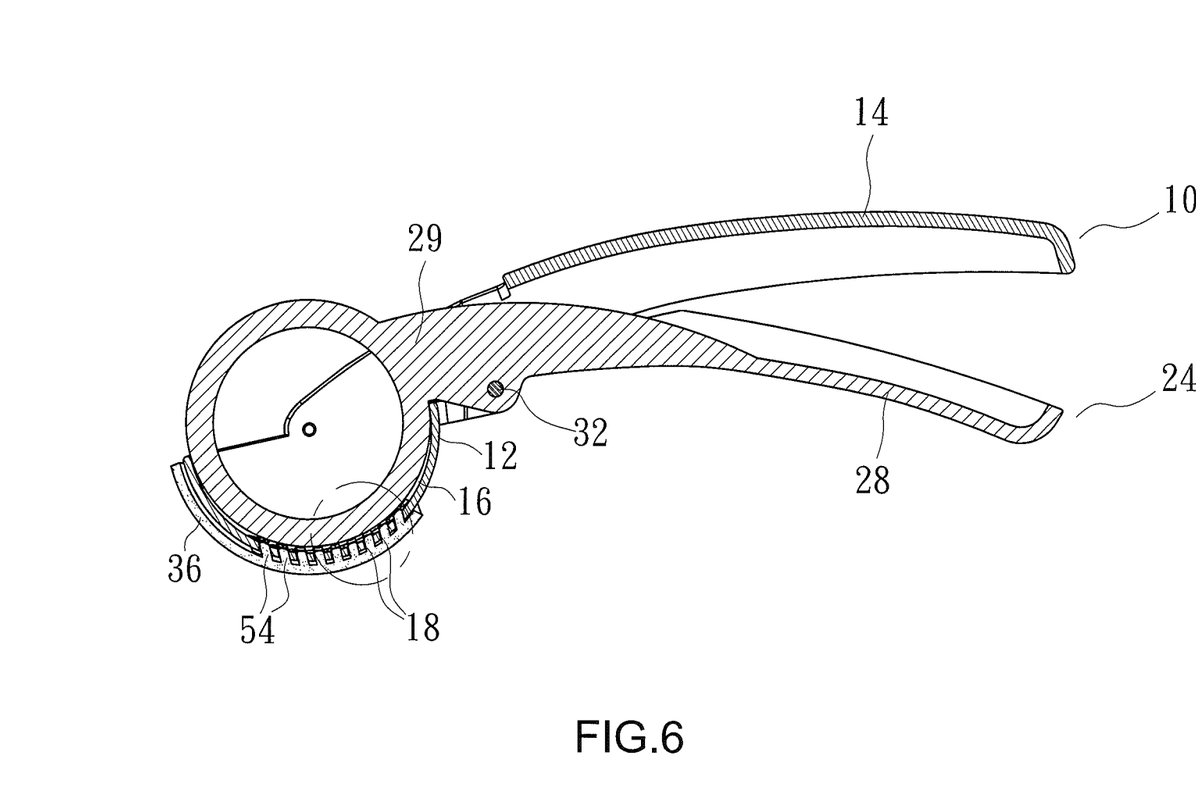
FIG. 6 is a sectional view of the garlic press of FIG. 5.
Figure 6A:
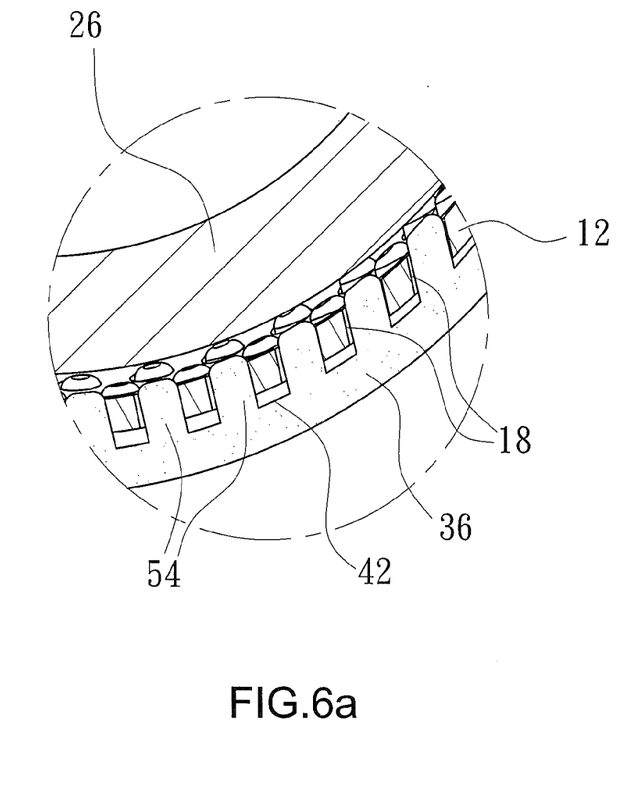
FIG. 6a shows an enlarged view of a circled portion in FIG. 6.
Figure 9:
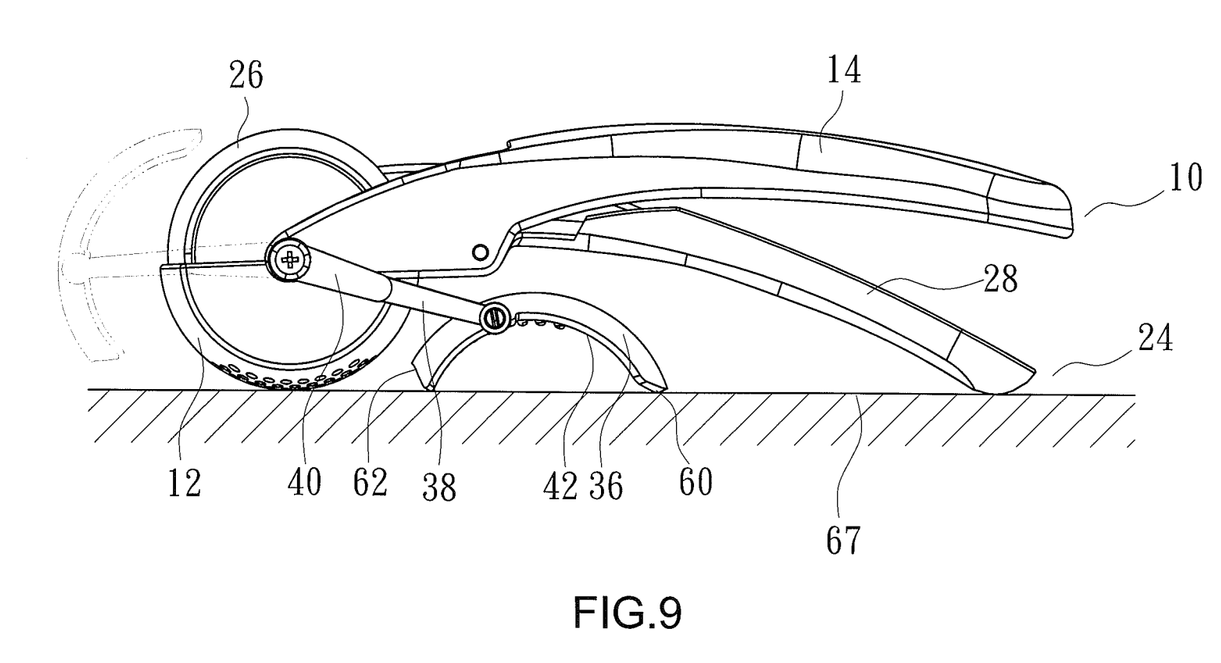
FIG. 9 is a schematic view of using the housing body, a lower handle and a scraper to support the garlic press of FIG. 5 on a placement surface.

Before operating the crush body 26 to crush a garlic clove or garlic bulblet, the scraper 36 of the cleaning device 34 can be disposed under the housing body 12, with the protruded pillars 54 inserted into the holes 18 of the housing body 12 as shown in FIG. 6. Alternatively, the scraper 36 can be moved to be disposed below the lower handle 28 as shown in FIG. 9. Furthermore, when the crushing of garlic is finished, a little amount of garlic mash will be adhered in the holes 18 of the housing body 12 and on inner and outer walls of the housing body 12. At this point, the cleaning device 34 can be used for cleaning out the remaining garlic mash.

In the operation of cleaning out the remaining garlic mash, the protruded pillars 54 of the scraper 36 are inserted into the holes 18 of the housing body 12 correspondingly to push the garlic mash adhered in the holes 18 upward to reach inside the chamber 16 of the housing body 12, so that the garlic mash remaining in the holes 18 can be cleaned out.

Figure 7:
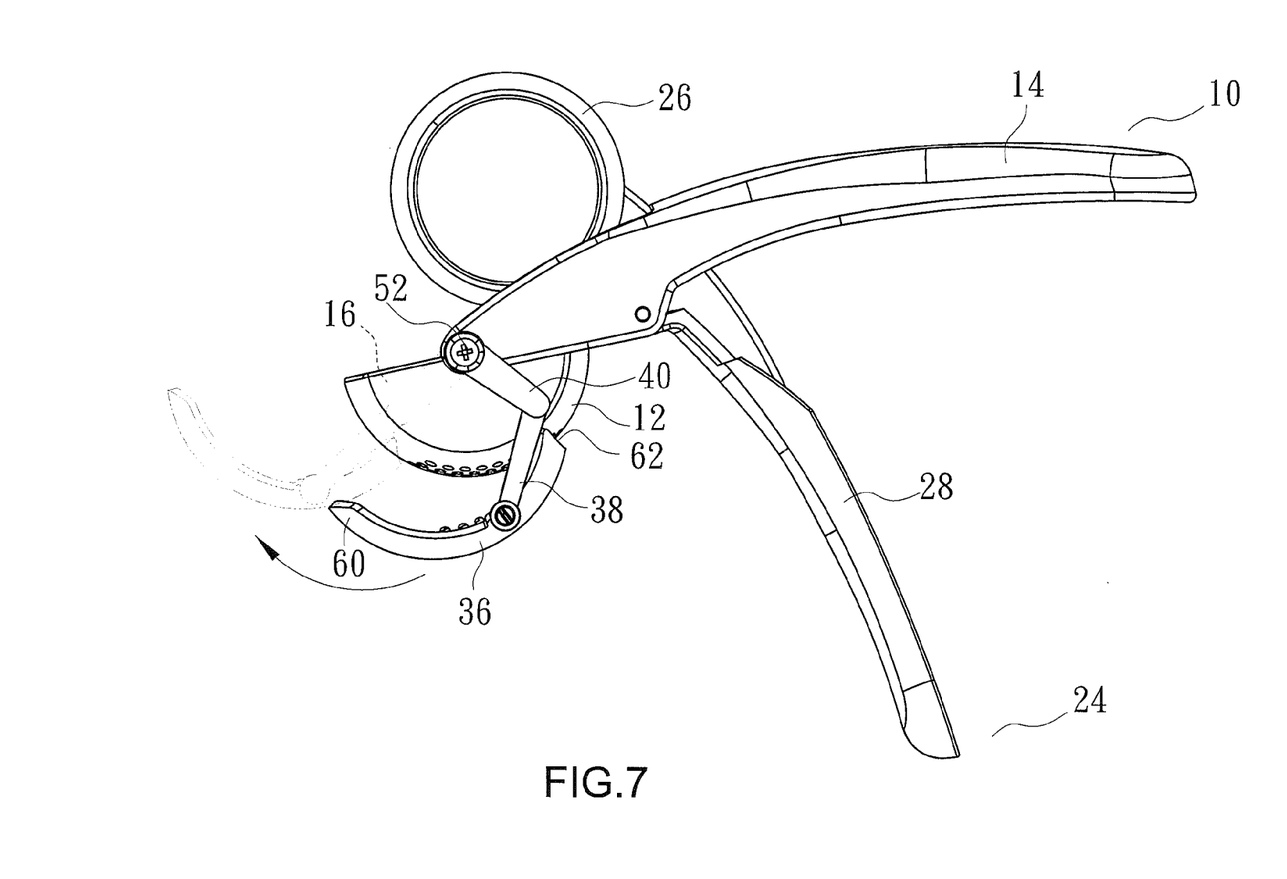
FIG. 7 is a schematic view of using the cleaning device of FIG. 5 to scrape off garlic mash remaining on an external portion of a housing body.

FIG. 7 shows how to operate the scraper 36 to use the rear edge 62 of the scraper 36 to scrape off the garlic mash remaining on the outer wall of the housing body 12. During the pulling of the scraper 36, the first and second links 38 and 40 will be moved around the housing body 12 to keep the rear edge 62 of the scraper 36 to stay on the outer wall of the bottom of the housing body 12.

Figure 8:
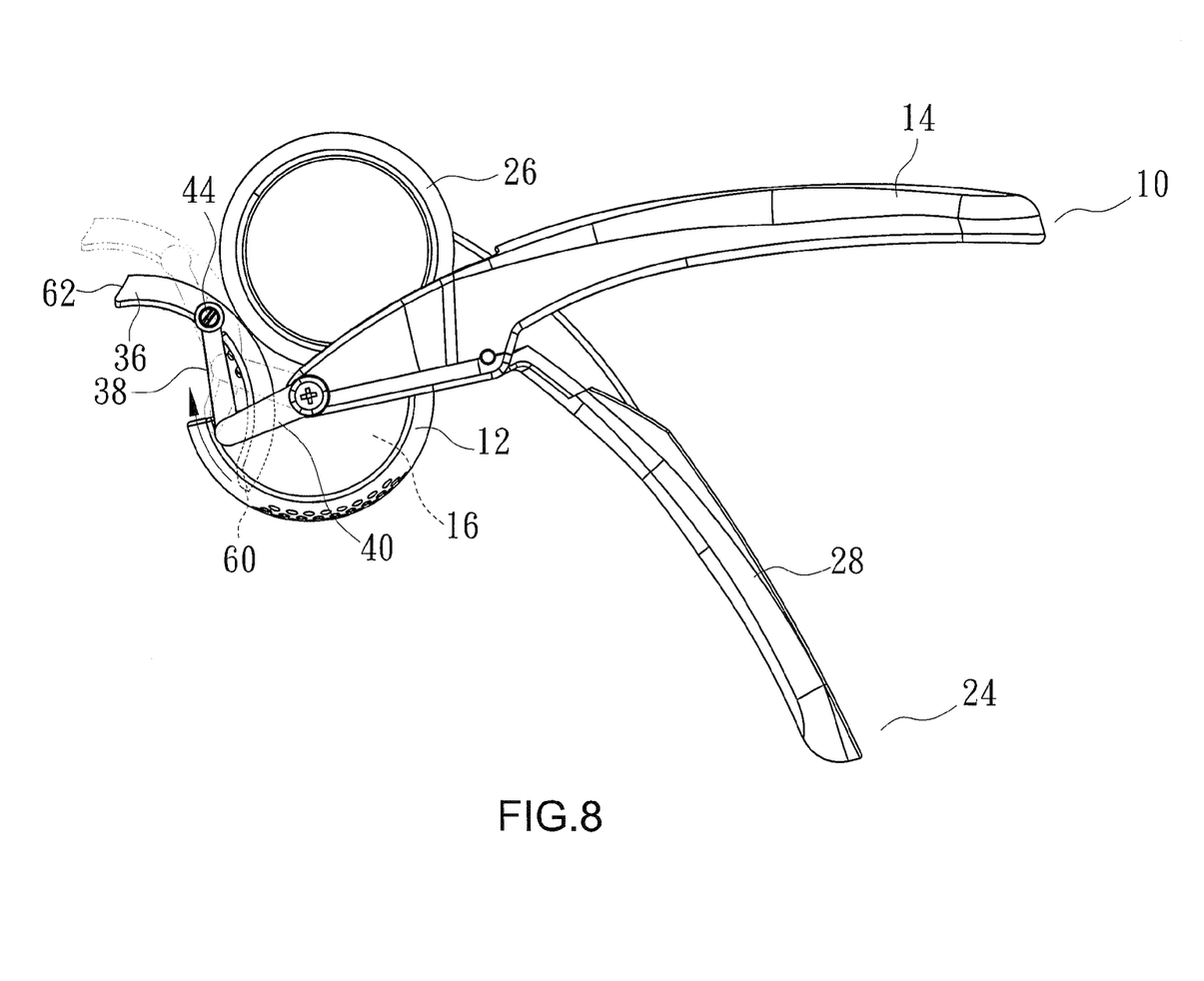
FIG. 8 is a schematic view of using the cleaning device of FIG. 5 to scrape off garlic mash remaining on an internal portion of the housing body.

FIG. 8 shows that the crush body 26 is moved to leave the chamber 16 of the housing body 12. The scraper 36 shown in FIG. 7 is turned upside down approximately 180 degrees about the pivotal pillars 44, so that the front edge 60 of the scraper 36 can be in contact with the inner wall of the housing body 12. Then, the scraper 36 can be pulled manually, and the front edge 60 can be used to scrape off the garlic mash which is pushed upward by the protruded pillars 54 and which remained in the chamber 16 of the housing body 12.

FIG. 9 shows how to turn the first and second links 38 and 40 toward the lower handle 28 to dispose the first and second links 38 and 40 in a rough straight line, and the concave inner surface 42 of the scraper 36 is turned upside down to face downward with the front and rear edges 60 and 62 of the scraper 36 being in contact with a placement surface 67. Thereby, the garlic press is supported by the housing body 12, the lower handle 28 and the scraper 36 on the placement surface 67 steadily.

Figure 10:
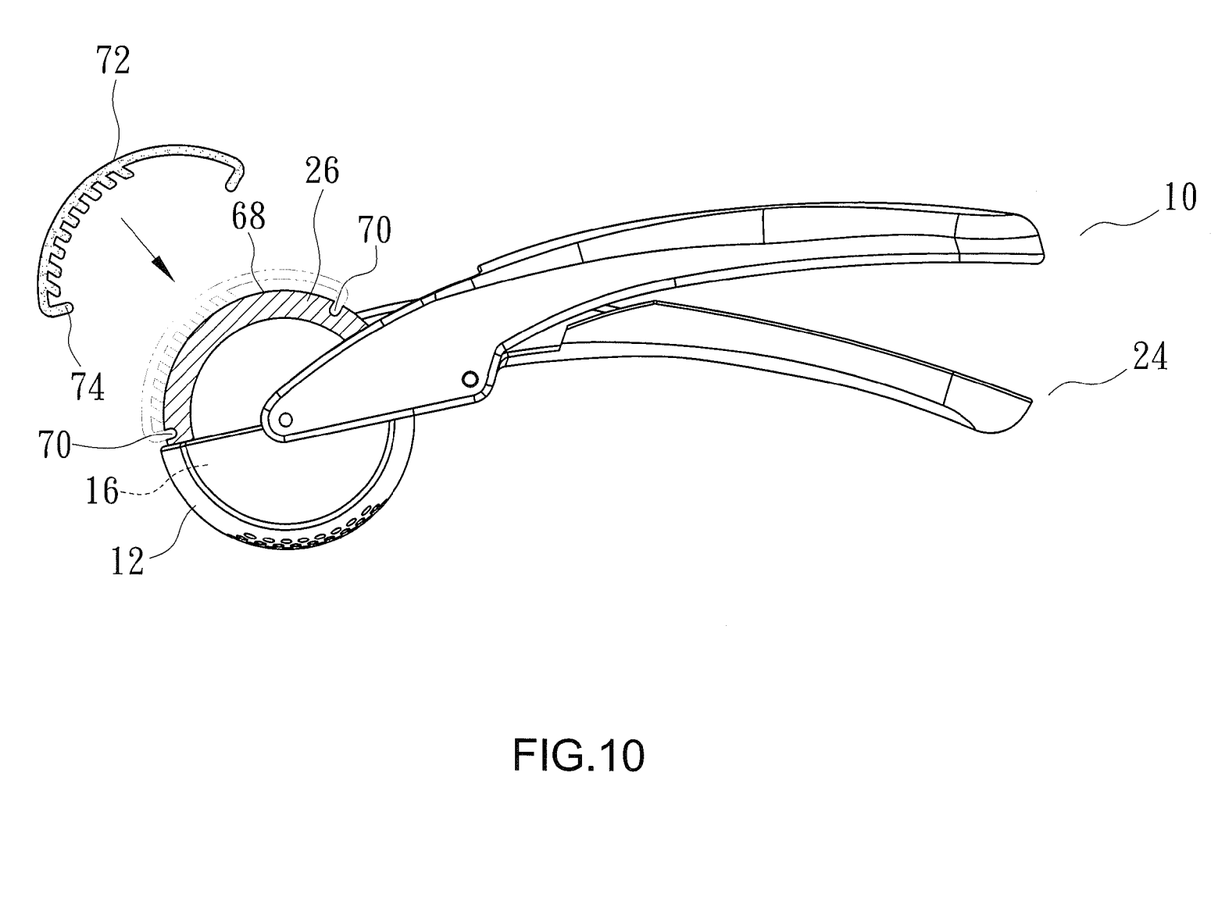
FIG. 10 is an exploded, perspective view of a garlic press according to a third embodiment of the present invention.

FIG. 10 shows a garlic press according to a third embodiment of the present invention and including a grip member 10, a crush member 24, and a detachable scraper 72. The grip member 10 and the crush member 24 have the same aforementioned structures. Two slots 70 are provided in a top portion 68 of the crush body 26, and two ends 74 of the scraper 72 are detachably engaged in the slots 70 correspondingly for coupling with the crush body 26. When the garlic press needs to be cleaned, the scraper 72 can be taken off for cleaning out the garlic mash remaining on the housing body 12.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A garlic press comprising:
   a grip member including a housing body and an upper handle extending backward from the housing body, with an opening formed in an upper end of the housing body, with a chamber formed in the housing body for accommodating garlic, with the upper handle including two lateral walls formed on a front end thereof and defining a pivotal space between the two lateral walls, with the housing body including two sides extending from the two lateral walls and terminating in a bottom having an arcuate shape in planes parallel to the two sides, with the two sides and the bottom defining the chamber, with holes formed in the bottom; and
   a crush member including a crush body and a lower handle extending backward from a rear end of the crush body, with a rear section of the lower handle disposed below the upper handle, with a front end of the lower handle disposed inside the pivotal space of the grip member and pivotally connected between the two lateral walls of the upper handle, with the crush body having an arcuate shape corresponding to the arcuate shape of the bottom and movably received in the chamber of the housing body for crushing the garlic, wherein the crush body is formed as a hollow ring having an axis parallel to but spaced from a pivotal connection between the upper and lower handles.

2. The garlic press according to claim 1, wherein the upper handle extends backward from the upper end of the housing body, with two opposed rear pivotal holes disposed in the two lateral walls of the upper handle, with an axial hole formed in the front end of the lower handle, with a pin extending through the rear pivotal holes of the grip member and the axial hole of the lower handle to allow the crush member to be turned pivotally relative to the grip member.

3. The garlic press according to claim 1, further comprising:
  a cleaning device, with the cleaning device including a scraper, two first links and two second links, with a pivotal pillar extending outwardly from each of two sides of the scraper, with a coupling hole disposed in each end of each first link, with an end of each second link pivotally connected to the upper handle, with a pivotal pillar disposed at another end of each second link, with the coupling holes of each first link pivotally connected with a corresponding pivotal pillar of the scraper and the pivotal pillar of a corresponding second link respectively.

4. The garlic press according to claim 3, wherein a connecting hole is disposed in the end of each second link, with two opposed front pivotal holes disposed in the two lateral walls of the upper handle, with a fastener extending through the connecting hole of each second link into a corresponding front pivotal hole of the upper handle to pivotally connect the cleaning device to the upper handle.

5. The garlic press according to claim 3, wherein the scraper includes a concave inner surface and a plurality of protruded pillars disposed on the inner surface of the scraper, wherein the upper handle extends backward from the upper end of the housing body, with two opposed rear pivotal holes disposed in the two lateral walls of the upper handle, with an axial hole formed in the front end of the lower handle, with a pin extending through the rear pivotal holes of the grip member and the axial hole of the lower handle.

6. The garlic press according to claim 5, wherein each pivotal pillar of the scraper includes a slot and two spaced projections formed on an outer end of the pivotal pillar, wherein the pivotal pillar of the second link includes a slot and two projections disposed on an outer end of the pivotal pillar.

7. The garlic press according to claim 2, further comprising:
  a detachable scraper, with two slots disposed in a top portion of the crush body, with the detachable scraper including two ends detachably engaged with the two slots of the crush body.

* * * * *